R. MONTGOMERY.
Freight Car.
No. 1,325. Reissued July 22, 1862.
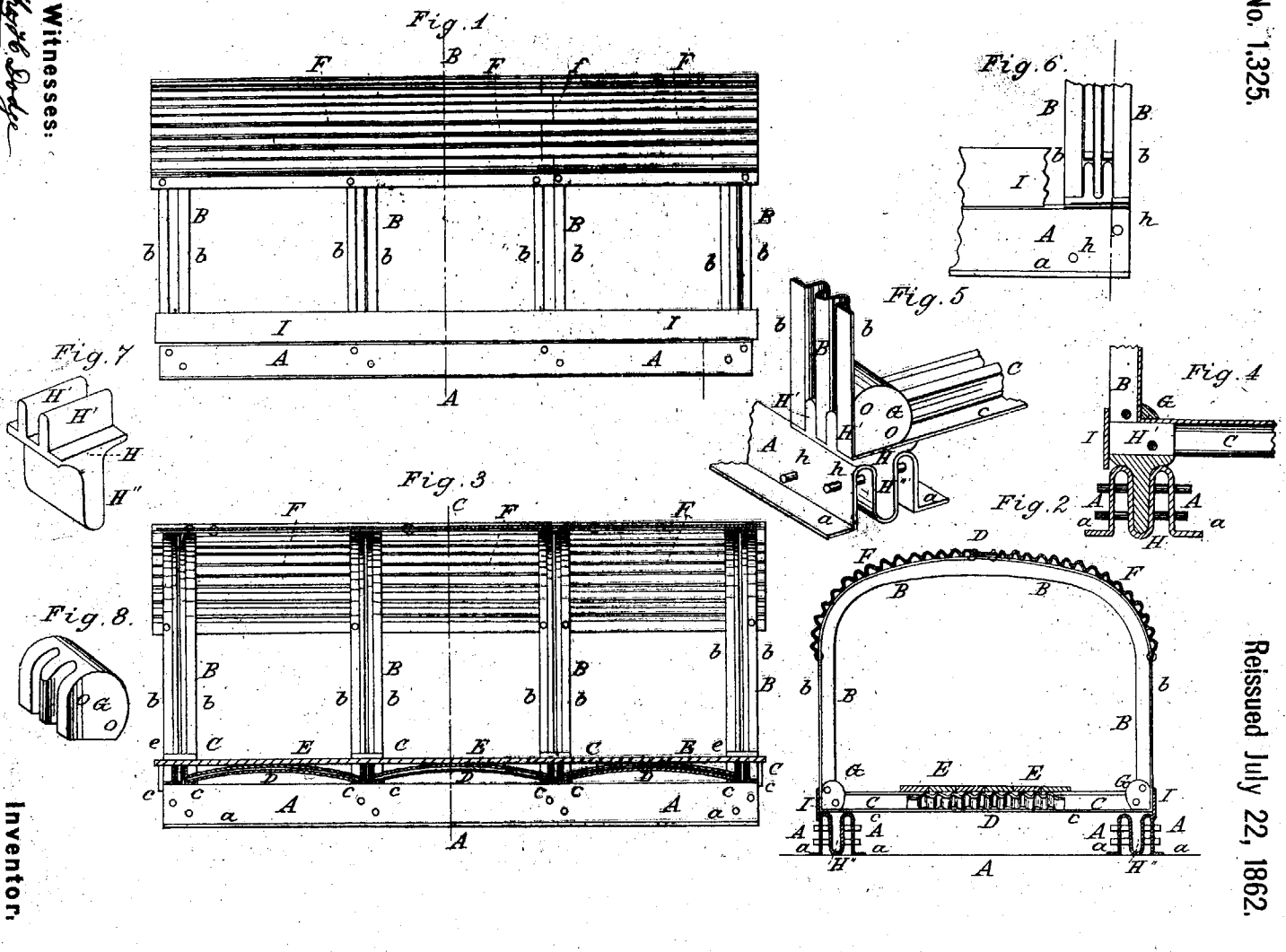
Witnesses:
Thos. H. Dodge
John Quincy Adams
Inventor:
Richard Montgomery

UNITED STATES PATENT OFFICE.

RICHARD MONTGOMERY, OF NEW YORK, N. Y.

IMPROVEMENT IN IRON CARS.

Specification forming part of Letters Patent No. 29,510, dated August 7, 1860; Reissue No., 1,325, dated July 22, 1862.

*To all whom it may concern:*

Be it known that I, RICHARD MONTGOMERY, of the city, county, and State of New York, have invented certain new and useful Improvements in Iron Cars for Railroads and other Purposes; and I do hereby declare that the following is a full, clear, and exact description thereof, reference being had to the annexed drawings, making a part of this specification, in which—

Figure 1 represents a side view of the frame of the car. Fig. 2 represents a section on line A B, Fig. 1, and A C, Fig. 3. Fig. 3 represents a section on line A D, Fig. 2, or a longitudinal section through the center of the car, the line being vertical. Figs. 4, 5, and 6 represent, on an enlarged scale, detached sections of parts of the car, to show more fully the mode of uniting the different parts. Figs. 7 and 8 represent the coupling-pieces by which the top, bottom, and cap piece are united.

The frame of the car is composed of longitudinal side and base pieces, A, arched top-pieces, B, and cross-pieces C. These pieces are all of corrugated iron or other metal, and correspond with each other in the form of the corrugations—that is, each has the same form when cut through on a line at right angles to the line of the corrugations. The nature and mode of constructing this corrugated metal is fully set forth in Patent No. 13,599, granted me on the 25th of September, 1855, this being the first time of its application to the purpose herein specified.

The base-pieces A have margins *a a*, and the top pieces, B, margins *b b*, while the cross-pieces or floor-pieces C have margins *c c*. The margins *a a* afford the means of securely fastening the frame of the superstructure to the truck-frame of the car or the running-gear of other vehicles, and the margins *b b* give an even surface for the attachment of the corrugated metallic covering F, by means of rivets or otherwise. The margins *c c* furnish the necessary support for the arched and corrugated floor-supports D. The floor E may be of ordinary flooring material, cut in proper length, width, and thickness, resting on the cross-pieces C, and the summit of the arched corrugated supports D. If desired, wooden pieces *e* may be inserted into the upper corugations in the cross-pieces C, for the purpose of receiving screws or nails to hold or fasten down the flooring E. The mode of fastening the curved top pieces, B, to the cross-pieces is fully shown in Figs. 4 and 5, and is effected in a simple yet firm and durable manner, as follows: The coupling-piece H is first placed with its lower projection, H′, in the upper corrugation in the base-piece A; the top piece, B, is then cut out at its ends so as to fit over the upper projections, H′ H′, and abutting against the end of the top piece, B, (see Fig. 4,) which is a section on a line, *a b*, Figs. 5 and 6. The other coupling-piece, G, is now placed in position, as shown in Figs. 2 and 5. It will thus be seen that the projections G′ of coupling-piece G fit into the central corrugation in the pieces B and C, and also between the projections H′ H′ of the coupling-pieces H, while its outer sides fit over the outer corrugations in the pieces B and C, and also in between the projections H′ H′ of the coupling-piece H, and they hold securely the posts in place. To hold the posts still more firm, bolts or rivets *h* may be passed through the coupling-pieces and the ends of the pieces A, B, and C, as shown in the drawings.

The lower part of the car—that is, the sides and ends—may be covered with smooth metallic sheets; but I prefer to make the top of corrugated iron or other metal, the grooves of the corrugations running from end to end—that is, in a longitudinal direction—while the whole top is curved or arched from side to side, as seen on the drawings. This arrangement and form of the top gives much additional strength to the car and greatly improves its appearance.

The number of arched top pieces, B, may be varied to suit the purposes to which the car is to be applied. When great strain and weight are to be borne, constantly or only occasionally, their number should of course be greater than where the car is to be used on roads where a lighter business is constantly done. The corrugated sheets that form the covering may be most advantageously united at the ends, in the manner shown at *f*, Fig. 1, and at the sides, as shown at *g*, Fig. 2. These ends of the plates should meet over one of the pieces B, so that their ends can be securely fastened or riveted down. The coupling-pieces H and G may be of cast metal.

The object of my invention has been to produce an iron or other metallic car that could be built cheap and at the same time possess the necessary strength and lightness, and be almost if not absolutely fire-proof. These points are all satisfactorily attained in this arrangement. The corrugated pieces, constructed in the manner described, can be made with great rapidity and economy, while the form given to the corrugations combines the greatest amount possible of strength with the smallest amount of material. By making the sides, ends, and doors of sheet-iron or other thin metallic substance, there is absolutely nothing left of the car-body proper of a combustible nature except the floor. The advantages of a car thus constructed over those in common use must be too obvious to need any argument.

Having thus fully described my invention, what I claim therein, and desire to secure by Letters Patent, is—

1. The use of the corrugated iron beams, constructed as described, when applied to railway-cars and other vehicles, in the manner and for the purposes set forth.

2. The combination of the curved top pieces, B, with the side or base pieces, A, and coupling-pieces H and G, arranged and operating substantially as described.

3. The combination of the cross-pieces C with the arch-supports D, substantially as and for the purposes set forth.

4. The corrugated covering F, arranged as described, in combination with the arched top pieces, B.

5. The coupling-pieces H and G, severally, and their application jointly or severally, in the manner and for the purposes set forth.

RICHARD MONTGOMERY.

Witnesses:
H. KING,
GILBERT B. TOWLES.